United States Patent
Caceres et al.

(10) Patent No.: US 9,871,783 B2
(45) Date of Patent: Jan. 16, 2018

(54) UNIVERSAL ENROLLMENT USING BIOMETRIC PKI

(71) Applicant: Verizon Patent and Licensing Inc., Arlington, VA (US)

(72) Inventors: Manuel Enrique Caceres, Basking Ridge, NJ (US); Yuk Lun Li, Morganville, NJ (US); Mauricio Pati Caldeira de Andrada, South Plainfield, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 93 days.

(21) Appl. No.: 14/751,694

(22) Filed: Jun. 26, 2015

(65) Prior Publication Data

US 2016/0381003 A1    Dec. 29, 2016

(51) Int. Cl.
*H04L 29/06* (2006.01)
*H04L 9/32* (2006.01)

(52) U.S. Cl.
CPC ........ *H04L 63/0823* (2013.01); *H04L 9/3263* (2013.01); *H04L 63/0442* (2013.01); *H04L 63/0861* (2013.01)

(58) Field of Classification Search
CPC .......... H04L 29/06775; H04L 63/0823; H04L 9/3263
USPC ....................................... 713/156, 150, 155
See application file for complete search history.

(56) References Cited

U.S. PATENT DOCUMENTS

| | | | | |
|---|---|---|---|---|
| 8,755,096 | B2* | 6/2014 | Yoshida | H04N 1/0285 358/475 |
| 2002/0026575 | A1* | 2/2002 | Wheeler | G06Q 20/00 713/156 |
| 2007/0028088 | A1* | 2/2007 | Bayrak | H04L 63/0428 713/150 |
| 2008/0222049 | A1* | 9/2008 | Loomis | G06Q 20/10 705/75 |
| 2013/0173926 | A1* | 7/2013 | Morese | G06F 19/10 713/186 |

(Continued)

OTHER PUBLICATIONS

A Novel Digital Content Protection Scheme Combining Iris Identity Based Digital Signature and Semi-fragile Watermark, Wang et al, DOI: 10.1109/ICCT.2006.341747, IEEE, 2006.*

(Continued)

*Primary Examiner* — Jahangir Kabir

(57) ABSTRACT

A system may obtain identification information for a user for obtaining a form of access using universal enrollment. The system may obtain a digital certificate associated with the identification information, the digital certificate including a public key of a public key, private key pair and the public key and the private key of the public key, private key pair being generated using first biometric information of the user obtained during the universal enrollment. The system may obtain second biometric information. The system may generate a second private key using the second biometric information. The system may determine whether the second private key matches the public key included in the digital certificate. The system may provide the form of access based on the second private key matching the public key included in the digital certificate.

20 Claims, 14 Drawing Sheets

(56) References Cited

U.S. PATENT DOCUMENTS

| | | | |
|---|---|---|---|
| 2015/0195278 A1* | 7/2015 | Plotkin | H04L 63/0861 |
| | | | 713/186 |
| 2015/0270977 A1* | 9/2015 | Martins | H04L 9/0866 |
| | | | 380/30 |
| 2015/0312041 A1* | 10/2015 | Choi | H04L 9/3231 |
| | | | 713/175 |
| 2016/0063300 A1* | 3/2016 | Du | G06K 9/00033 |
| | | | 382/124 |
| 2016/0125416 A1* | 5/2016 | Spencer | G06Q 20/1085 |
| | | | 705/71 |
| 2016/0149904 A1* | 5/2016 | Kim | G06F 21/32 |
| | | | 713/186 |

OTHER PUBLICATIONS

Improvement of existing security system by using elliptic curve and biometric cryptography, Rathi et al, 10.1109/CCAA.2015.7148520, IEEE, Jul. 2015.*

A Design of Certificate Authority Based on Elliptic Curve Cryptography, Yangtao et al, 10.1109/DCABES.2010.99, IEEE, 2010.*

Wikipedia, "Elliptic curve cryptography," http://en.wikipedia.org/wiki/Elliptic_curve_cryptography, Mar. 18, 2015, 12 pages.

Wikipedia, "RSA (cryptosystem)," http://en.wikipedia.org/wiki/RSA_(cryptosystem), Apr. 3, 2015, 16 pages.

Sullivan, "A (relatively easy to understand) primer on elliptic curve cryptography," http://arstechnica.com/security/2013/10/a-relatively-easy-to-understand-primer-on-elliptic-curve-cryptography/2/, Oct. 24, 2013, 7 pages.

\* cited by examiner

UNIVERSAL ENROLLMENT USING BIOMETRIC PKI

BACKGROUND

Biometrics refers to metrics related to human characteristics. Biometric authentication is used as a form of identification and access control. Biometric identifiers are distinctive, measurable characteristics used to label and describe individuals. Biometric identifiers are often categorized as physiological versus behavioral characteristics. Physiological characteristics are related to the shape of a human body. Examples include, fingerprints, palm veins, facial characteristics, iris characteristics, voice characteristics, or the like. Behavioral characteristics are related to patterns of behavior. Examples include typing, rhythm, gait, or the like.

DETAILED DESCRIPTION OF PREFERRED EMBODIMENTS

The following detailed description of example implementations refers to the accompanying drawings. The same reference numbers in different drawings may identify the same or similar elements.

Biometric information (e.g., a fingerprint, palm veins, facial characteristics, iris characteristics, voice characteristics, etc.) may be used to authenticate a user. Biometric information of a user is obtained and compared against stored biometric information. Access to a location, to information, to an application, or the like, may be granted if the biometric information matches stored biometric information, indicating an authorized user.

The adoption of authenticating a user by using a mobile device and/or another portable user device has been slow. In such situations, biometric information may be obtained by the mobile device and/or an other portable user device and provided to a remote storage location (e.g., the Cloud). A user may be concerned that the biometric information, including creation of a biometric template used for authenticating the user, may be a target for attacks by unauthorized users with possible ill intent, such as theft of the users' biometric information/identity. The unauthorized users may use the stolen biometric information/identity for unauthorized access.

One solution proposed by Fast Identity Online (FIDO) Alliance has been to associate a private/public key pair with the biometric information so that the biometric information does not have to be stored remotely. A problem with this solution is that if the user attempts to access a service (e.g., Cloud services) by authenticating to the service using biometric information previously provided during the universal enrollment using a first device (e.g., an enrollment device), a second device (e.g., a verification device) may not recognize the previously provided biometric information and/or the user. The second device may consume processing power and/or resources attempting to obtain previously, provided biometric information and re-enrollment information for the user.

Implementations described here utilize a system for universal enrollment using a biometric public key infrastructure (PKI), where a user may enroll for access once using a first device (e.g., an enrollment device). A generated, public/private key pair using biometric information, associated with identification information for the user, may be used to verify and/or authenticate the user without requiring re-enrollment and/or storage of the biometric information by a second device (e.g. verification device).

Figure 1A:
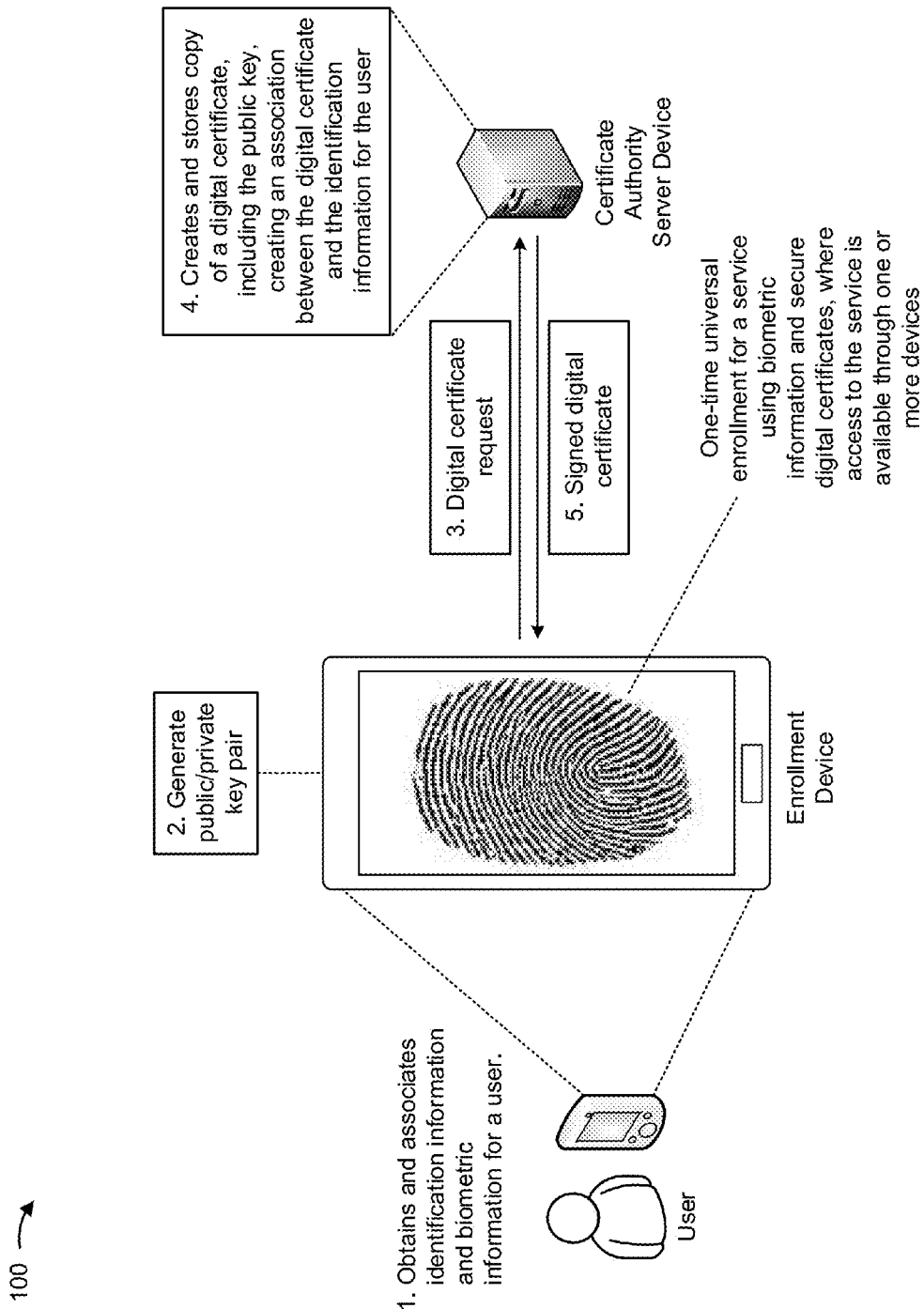
FIGS. 1A-1C are diagrams of an overview of an example implementation described herein.
Figure 1B:
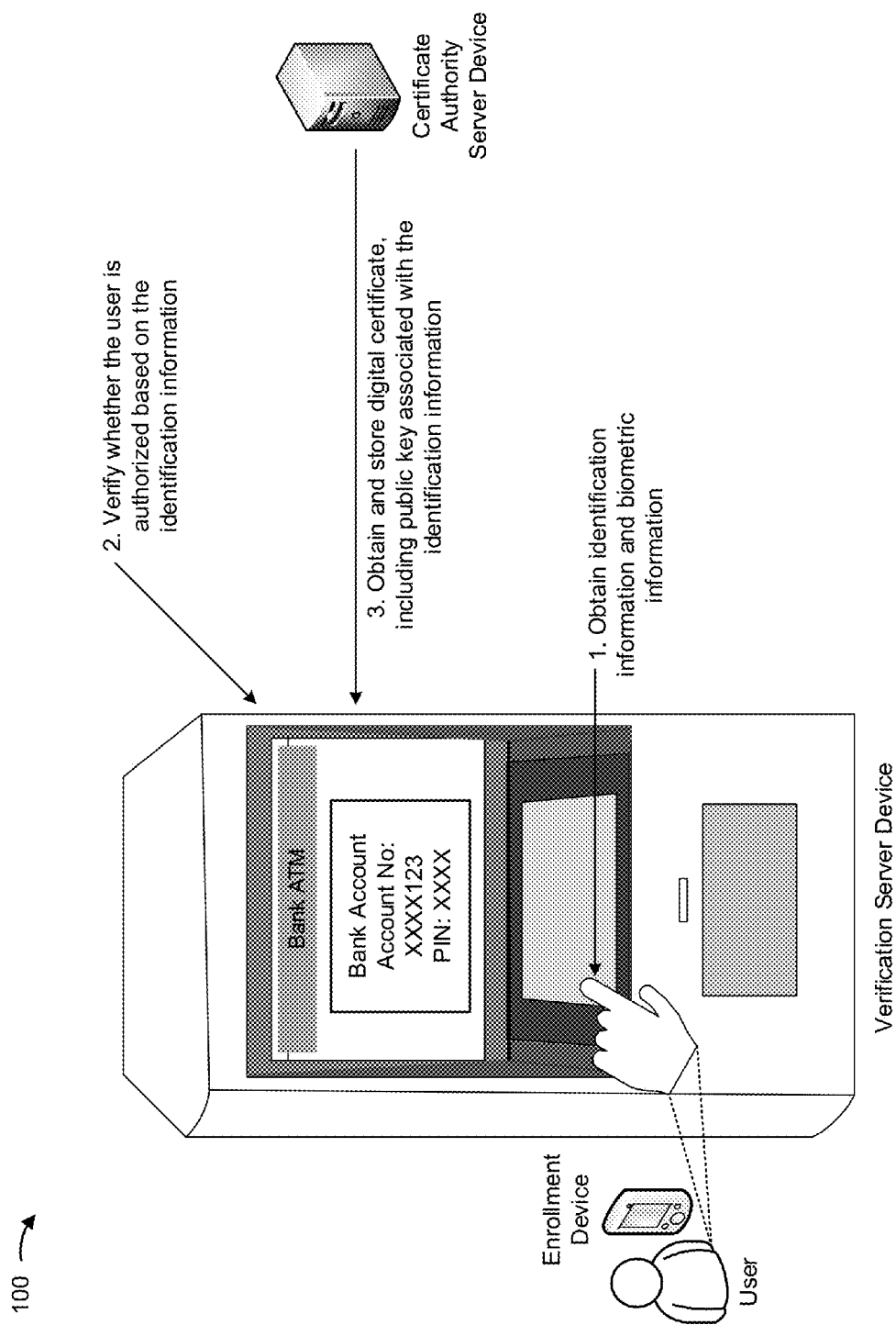
Figure 1C:
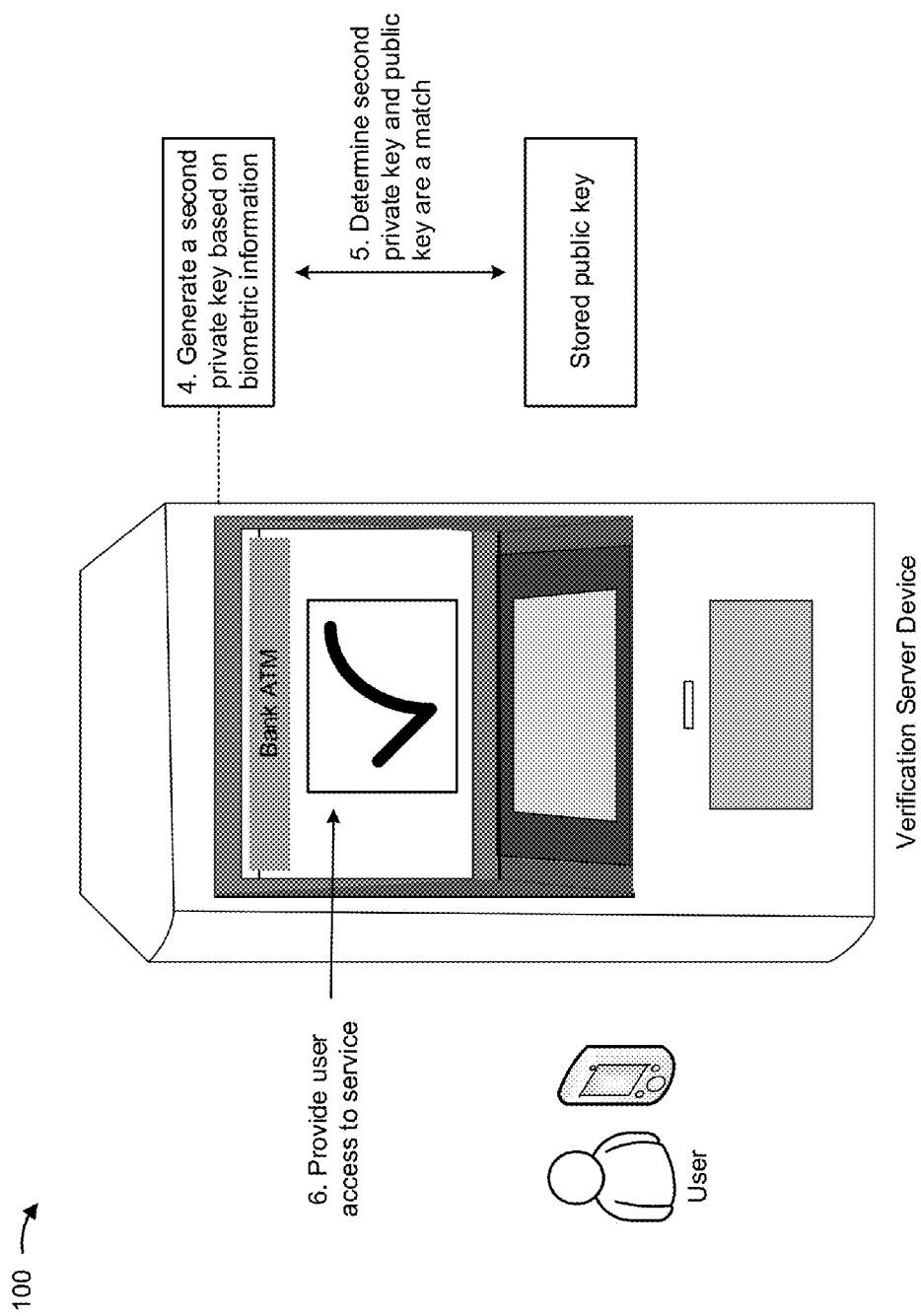

FIGS. 1A-1C are diagrams of an overview of an example implementation 100 described herein. As shown in FIG. 1A, assume a user (e.g., User) seeks to use an enrollment device (e.g., a mobile phone) to create universal enrollment, using biometric information for access to a service (e.g., a bank account). The user may create and/or provide identification information associated with obtaining access to the service and/or location. For example, a user may create a user account, a personal identification number (PIN), a password, or the like.

As shown in FIG. 1A, and by reference number 1, the user may provide identification information and biometric information (e.g., provide fingerprint information through a fingerprint reader) to the enrollment device. As shown in FIG. 1A, and by reference number 1, enrollment device may associate the biometric information with the identification information. As shown by reference number 2, the user device may generate a public/private key pair, using a cryptographic method (e.g., a Rivest-Shamir-Adleman (RSA) cryptosystem, an elliptical curve cryptography (ECC) cryptosystem, etc.) applied to the biometric information. The public key may be associated with the identification information. Additionally, the public/private key pair may be associated with a larger PKI.

PKI is a set of hardware, software, people, policies, and procedures used to create, manage, distribute, use, store, and revoke digital certificates. In cryptography, a PKI is an arrangement that binds public keys with respective user identities using a certificate authority (CA). The user identity (e.g., identification information) is unique within each CA domain. The binding is established through a registration and issuance process, which, depending on the assurance level of the binding, may be carried out by software at a CA or under human supervision. PKI enables users to securely communicate on an insecure public network, and reliably verify the identity of a user via digital signatures.

As shown in FIG. 1A, and by reference number 3, the enrollment device may request a digital certificate from a CA (e.g., via a CA server device), the request including a public key, associated with the identification information for the user. As shown in FIG. 1A, and by reference number 4, the CA server device creates the digital certificate, associating the digital certificate including the public key with the identification information of the user. The CA server device may store a copy of the digital certificate, associated with the identification information, as shown by reference number 4, and provides a signed digital certificate to the enrollment device, as shown by reference number 5.

As shown in FIG. 1B, the user may attempt to access the bank account at a verification server device (e.g., an automated teller machine (ATM)). As shown by FIG. 1B, and by reference number 1, the verification server device may obtain identification information provided by the user (e.g., the user may provide a bank account number using a bank card, associated with the bank account, and provide a PIN). As shown by reference number 1, the verification server device may also obtain biometric information (e.g., fingerprint information), provided by the user.

As shown by FIG. 1B, and by reference number 2, the verification server device may verify whether the user is authorized to use the service, based on the identification information provided. As shown by FIG. 1B, and by reference number 3, the verification server device may obtain the public key, associated with the identification information, from the CA server device. The verification server device may obtain the biometric information obtaining the public key.

As shown by FIG. 1C, and by reference number 4, the verification server device may generate a second private key based on the biometric information provided by the user. As shown by FIG. 1C, and by reference number 5, the verification server device may determine whether the second private key matches the public key obtained from and/or stored by from the CA server device. As shown by FIG. 1C, and by reference number 6, the verification server device may provide access to the service (e.g., the user may access the user's bank account) when the second private key matches the public key.

In this way, the verification server device may enable a user to benefit from universal enrollment using biometric PKI, where the user may provide and enroll one time. Additionally, sensitive biometric information is not stored remotely, where the biometric information may be a target for an attack. The verification server device may save processing time and resources by not requiring the user to re-enroll to obtain access and/or store the biometric information locally.

While the description to follow will focus on biometric information using fingerprint information, the description may apply to other types of biometric information. For example, biometric information may include palm vein information, face recognition, iris recognition, voice recognition, or the like, and may be used to generate a public/private key pair using cryptography methods. Additionally, while the description to follow will focus on using universal enrollment to access a service, the description may apply to other forms of access (e.g., to a physical or virtual location, to information, to an application, or the like).

Figure 2:
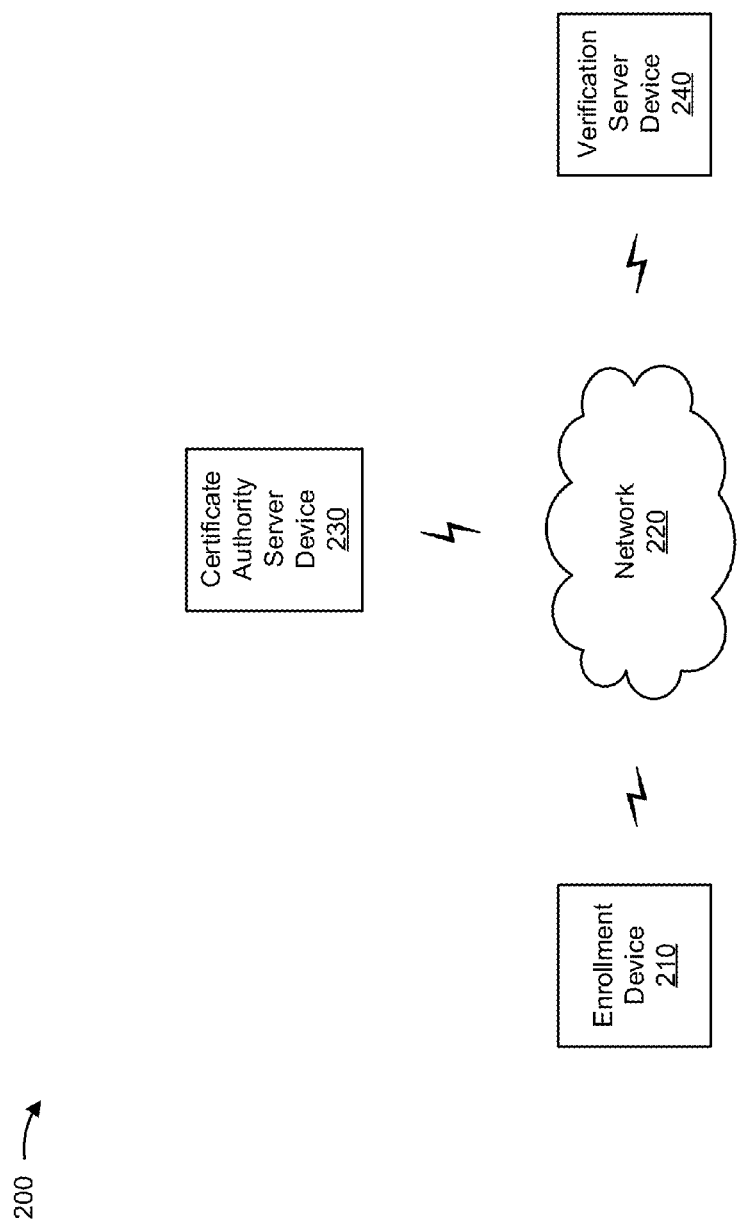
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include an enrollment device 210, a network 220, a CA server device 230, and a verification server device 240. Devices of environment 200 may interconnect via wired connections, wireless connections, or a combination of wired and wireless connections.

Enrollment device 210 may include one or more devices capable of communicating with a network (e.g., network 220). For example, enrollment device 210 may include a wireless communication device, a radiotelephone, a personal communications system (PCS) terminal (e.g., that may combine a cellular radiotelephone with data processing and data communications capabilities), a smart phone, a smart watch, a laptop computer, a tablet computer, a gaming system, and/or a similar device. Enrollment device 210 may send traffic to and/or receive traffic from network 220. Enrollment device 210 may obtain and/or store biometric information. Enrollment device 210 may create a minutiae template associated with the biometric information. Enrollment device 210 may generate a public/private key pair associated with the biometric information, using cryptographic methods and the created minutiae template, for facilitating universal enrollment.

Network 220 may include one or more wired and/or wireless networks. For example, network 220 may include a cellular network (e.g., a long-term evolution network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

CA server device 230 may include one or more server devices capable of generating, processing, and/or providing information. For example, CA server device 230 may authenticate an identity of a user of enrollment device 210 and/or another device, based on non-secure biometric information included in a public key provided to CA server device 230 for verification. CA server device 230 may issue and/or sign a digital certificate, verifying the identity of the user and associating the digital certificate, including the public key, to the identification information for the user. CA server device 230 may provide the public key to enrollment device 210.

Verification server device 240 may include one or more server devices capable of generating, processing, and/or providing information. For example, verification server device 240 may obtain identification information and/or biometric for a user. Verification server device 240 may determine whether the identification information is valid. Verification server device 240 may include a client application and/or user interface for receiving identification information and/or biometric information. Verification server device 240 may include software for creating a minutiae template for the biometric information (e.g., fingerprints) and/or re-creating a private key from the public/private key pair generated for enrollment device 210.

Verification server device may include a wireless communication device, a radiotelephone, a personal communications system (PCS) terminal (e.g., that may combine a cellular radiotelephone with data processing and data communications capabilities), a smart phone, a smart watch, a laptop computer, a tablet computer, a personal gaming system, and/or a similar device.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
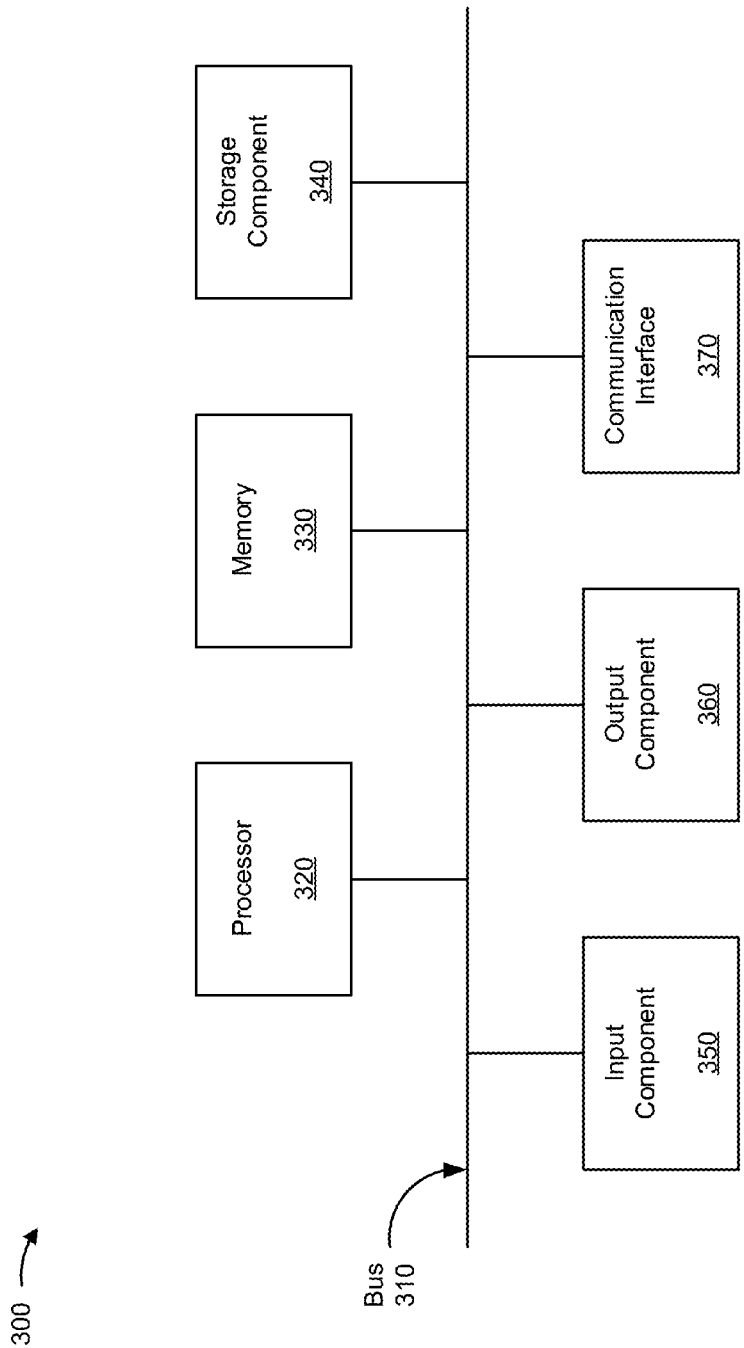
FIG. 3 is a diagram of example components of one or more devices of FIG. 2.

FIG. 3 is a diagram of example components of a device 300. Device 300 may correspond to enrollment device 210, CA server device 230, and/or verification server device 240.

In some implementations, enrollment device 210, CA server device 230, and/or verification server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
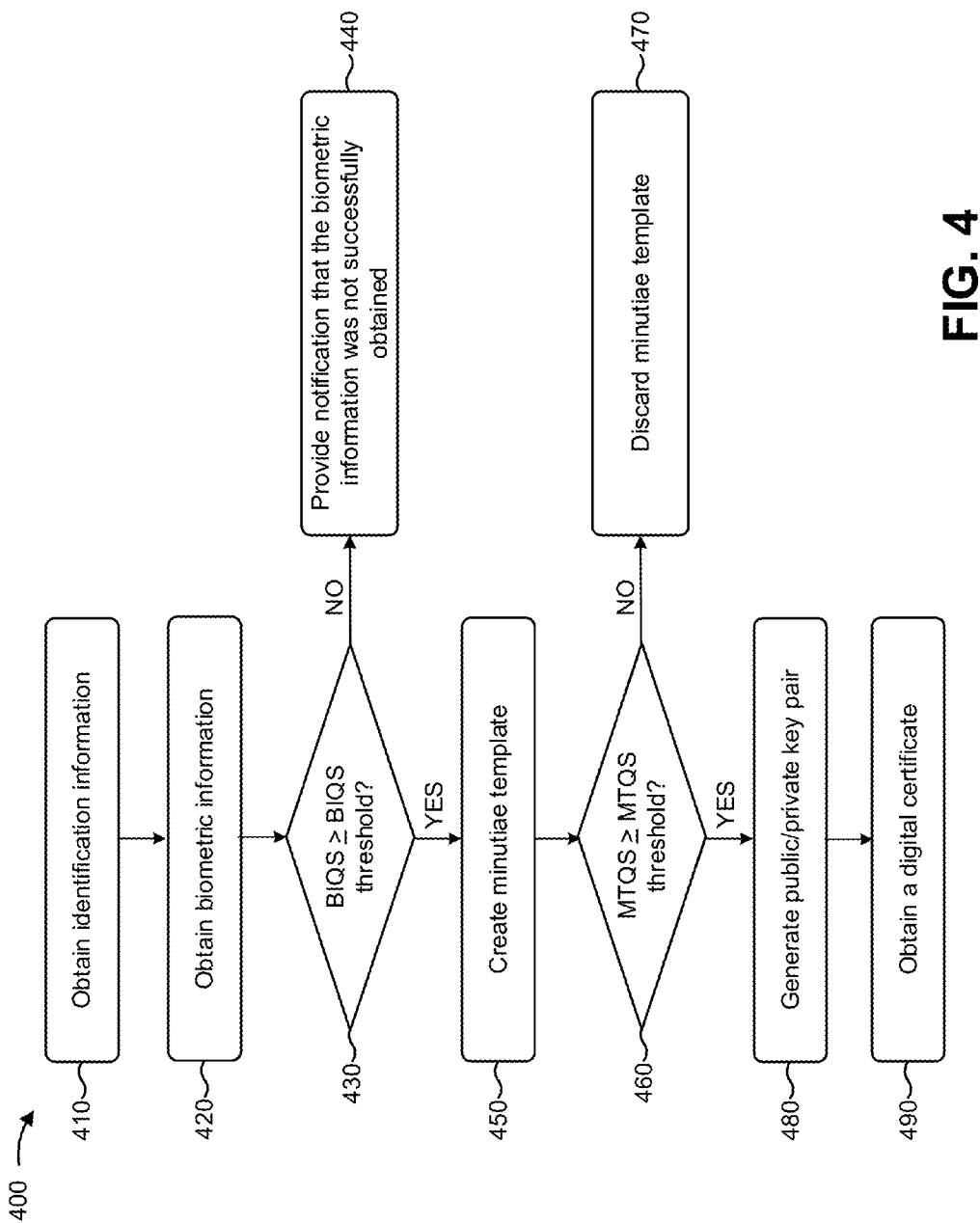
FIG. 4 is a flow chart of an example process for setting up universal enrollment using biometric public key infrastructure.

FIG. 4 is a flow chart of an example process 400 for setting up universal enrollment using biometric PKI. In some implementations, one or more process blocks of FIG. 4 may be performed by enrollment device 210. Additionally, or alternatively, one or more process blocks of FIG. 4 may be performed by another device or a group of devices separate from or including enrollment device 210, such as CA server device 230 and/or verification server device 240.

As shown in FIG. 4, process 400 may include obtaining identification information (block 410). For example, enrollment device 210 may obtain identification information to access a service (e.g., a bank account). A user may create and/or provide identification information associated with accessing the service. For example, the user may create and/or provide, to enrollment device 210, an account number, a PIN, a password, or the like associated with the bank account.

As shown in FIG. 4, process 400 may include obtaining biometric information (block 420). For example, enrollment device 210 may obtain first biometric information (e.g., biometric information), including one or more biometric images (e.g., fingerprint information, including one or more fingerprint images) from a user. The user may place one or more fingers properly (e.g., centered, straight, applying an amount of pressure so as to obtain a fingerprint image, etc.) on a fingerprint reader, associated with enrollment device 210, to obtain fingerprint information. Fingerprint information may include one or more fingerprints associated with one or more of the user's fingers. Enrollment device 210 may capture the fingerprint information (e.g., by scanning) an image of the one or more fingers. Additionally, or alternatively, enrollment device 210 may perform a sensor calibration to capture sensor information (e.g., sensor size, image size, etc.). The sensor information may be included in a digital certificate and provided to verification server device 240 to aid verification server device 240 in obtaining biometric information of the user at a later time.

In some implementations, enrollment device 210 may prompt the user to provide the fingerprints in a sequence (e.g., starting with pinky finger on left hand and continuing in order to thumb; providing the fingers in a random sequence; providing every other finger, etc.). In some implementations, enrollment device 210 may prompt the user to select the sequence in which to provide the fingerprints (e.g., a quantity of fingers to use in the sequence, an order for the sequence, etc.).

The sequence may be used as an added layer of security at a time when the user wants access to a service from another device (e.g., verification server device 240). For example, verification server device 240 may ask the user to provide the sequence (i.e., provide fingers in the same order as the user provided at a time of enrollment). In this way, if the biometric information is subject to attack and/or stolen, the unauthorized user may not be able to access the service without knowing the sequence used, at the time of enrollment, in order to generate a matching private key. The user may also change the sequence and/or store the changed sequence so that the sequence is not static.

Additionally, or alternatively, enrollment device 210 may associate the biometric information to the identification information for the user, associated with the service for which the user seeks universal enrollment.

As further shown in FIG. 4, process 400 may include determining whether a biometric information quality score (BIQS) is greater than a BIQS threshold (block 430). For example, enrollment device 210 may determine a BIQS (e.g., a fingerprint image quality score as determined by National Institute of Standards and Technology (NIST), also known as a NIFQ score). Under a NIFQ scale, a score=1 indicates a highest quality of a fingerprint image and a score=5 indicates a lowest quality of a fingerprint image.

Enrollment device 210 may determine whether the BIQS, for the obtained biometric information, is greater than or equal to a BIQS threshold (e.g., NIFQ threshold≥3). If the BIQS is greater than or equal to the BIQS threshold (i.e., NIFQ=1, 2, or 3), then the biometric information was successfully obtained. If the BIQS is less than the BIQS threshold (i.e., NIFQ=4 or 5), then the biometric information was not successfully obtained.

As further shown in FIG. 4, if the BIQS is not greater than or equal to the BIQS threshold (block 430—NO), process 400 may include providing a notification that the biometric information was not successfully obtained (block 440). For example, enrollment device 210 may provide a notification that the biometric information was not successfully obtained. In some implementations, enrollment device 210 may provide the notification for display on enrollment device 210. In some implementations, enrollment device 210 may provide a reason so that the user of enrollment device 210 may understand why the biometric information was not successfully obtained.

As further shown in FIG. 4, if the BIQS is greater than or equal to the BIQS threshold (block 430—YES), process 400 may include creating a minutiae template (block 450). For example, enrollment device 210 may include software to create a minutiae template based on the image of the fingerprint. Enrollment device 210 may determine one or more minutiae points for the fingerprint image. A minutiae point is a point of interest for a fingerprint image (e.g., a ridge ending, a ridge bifurcation, a spur, a ridge enclosure, etc.). Enrollment device 210 may determine the one or more minutiae points through various techniques (e.g., extraction of minutiae points by binarization, extraction of minutiae points by thinning, extraction of minutiae points by minutiae detection, etc.).

Additionally, or alternatively, enrollment device 210 may create a minutiae template based on the one or more minutiae points extracted from the fingerprint image. A minutiae template is a file of a minutiae map, specifying a position (e.g., x-coordinate, y-coordinate, etc.) for the one or more minutiae points, a direction (e.g., angle), a type (e.g., bifurcation, termination, etc.), or the like for one or more minutiae points. Minutiae templates are a fraction of the size of fingerprint images, use less storage in memory, may be transmitted faster electronically than images, and may be a highly accurate alternative to a fingerprint image. Additionally, or alternatively, enrollment device 210 may store the minutiae template.

As further shown in FIG. 4, process 400 may include determining whether a minutiae template quality score (MTQS) is greater than or equal to a MTQS threshold (block 460). For example, enrollment device 210 may determine a MTQS for the minutiae template. In some implementations, enrollment device 210 may select quality metrics for analysis (e.g., a triangle perimeter, a triangle area, a ratio between the triangle perimeter and the triangle area, or the like, for triangles formed using minutiae points of a fingerprint image, using Delaunay triangulation and/or another technique). Enrollment device 210 may use an algorithm to calculate the MTQS using the quality metrics selected. Enrollment device 210 may set a MTQS threshold (e.g., 20%, 25%, 30%, etc.). If the MTQS is greater than or equal to the MTQS threshold, then the minutiae template is acceptable. If the MTQS is not greater than or equal to the MTQS threshold, then the minutiae template is not acceptable.

As further shown in FIG. 4, if the MTQS is not greater than or equal to the MTQS threshold (block 460—NO), process 400 may include discarding the template (block 470). For example, enrollment device 210 may discard the minutiae template (e.g., deleting the minutiae template from memory). Additionally, or alternatively, enrollment device 210 may provide a notification that the minutiae template was not successfully obtained. In some implementations, enrollment device 210 may provide the notification for display on enrollment device 210. In some implementations, enrollment device 210 may provide a reason so that the user of enrollment device 210 may understand why the biometric information was not successfully obtained.

As further shown in FIG. 4, if the MTQS is greater than or equal to the MTQS threshold (block 460—YES), process 400 may include generating a public/private key pair (block 480). For example, enrollment device 210 may use a cryptography method to generate a public/private key pair. In some implementations, the public/private key pair may be generated using an ECC cryptosystem. An ECC cryptosystem is an approach to public-key cryptography, based on using an algebraic structure of elliptic curves to create faster, smaller, and more efficient cryptographic keys. An elliptical curve, defined over a finite field F (e.g., a prime field, a binary field, etc.), is a set of solutions to a polynomial curve equation $y^2=x^3+ax+b$, where 'a' and 'b' are constants that lie in the finite field F. A solution to the polynomial curve equation may not equal zero.

The elliptical curve may resemble a side-lying bell. A point version of the elliptical curve may be created, by selecting and/or displaying positive whole number integers, lying on the first elliptical curve.

The elliptical curve (e.g., an elliptic curve E) has certain properties that allow for cryptography: 1) an identity property where P+O=O+P; 2) an inverse property where P+(−P)=O; 3) an associative property where P+(Q+R)=(P+Q)+R; and 4) a commutative property where P+R=R+Q. Here P, Q, and R are points on the elliptical curve, where R=P+Q (discussed herein in detail below) and O is an identity element.

The elliptical curve allows for point addition. A non-vertical line, connecting a first point (e.g., point P) and a second distinct point (e.g., point Q) on the elliptical curve, will intersect the elliptical curve at one more place on the curve (e.g., point −R). That is, a non-vertical line (e.g., P does not equal −Q) will intersect the elliptical curve at three points. A determined third point of intersection (e.g., −R) may be reflected over an x-axis to provide a result of adding the first point and the second point (e.g. P+Q=R, where R is a reflection of point −R over the x-axis).

Additionally, the elliptical curve allows for point doubling. A line drawn tangent to the first point (e.g., point P) will intersect the elliptical curve at the third point (e.g., −R). The reflection of the third point with respect to the x-axis provides a result that is the same as adding the first point and the second point (e.g., P+Q=R).

Point addition and point doubling may be used (e.g., using an algorithm called "double-and-add") to determine scalar multiplication for a point, that is multiplying a scalar value (i.e., an integer) with a point on the elliptical curve (e.g., R=d·P). An inverse operation for the scalar multiplication (i.e., determining 'd' for a given P and R) is called a discrete logarithm. Determining the discrete logarithm, without a key, may be considered computationally infeasible, and thus a foundation for ECC cryptosystems (e.g., Q=d·G, where d may serve as a private key of a public/private key pair, G may serve as a generator or base point of the elliptical curve, and Q is the public key of the public/private key pair).

Enrollment device 210 may create an ECC cryptosystem by selecting a polynomial curve equation (e.g., $y^2=x^3-x+1$, where 'a'=−1 and 'b'=1 within a finite field F) for generating an elliptical curve. Enrollment device 210 may create a point version of the elliptical curve by selecting positive integers lying on the elliptical curve. Enrollment device 210 may overlay the minutiae template, created in block 450, on the point version of the elliptical curve and select overlapping points on the elliptical curve. By overlaying the minutiae template to select overlapping points, the elliptical curve is unique and based on biometric information unique to a user.

Additionally, or alternatively, enrollment device 210 may select a base point (e.g., point G) on the elliptical curve. Additionally, or alternatively, enrollment device 210 may generate one or more lines connecting two overlapping points on the elliptical curve. Enrollment device 210 may extend the one or more lines by finding a third point of intersection on the elliptical curve. Additionally, or alternatively, enrollment device 210 may calculate a distance of the one or more lines. Enrollment device 210 may aggregate the distance of the one or more lines to determine an integer, representing a private key (e.g., private key 'd' so that 0<d<n, where n is a number of different points on the elliptical curve, which may be gained by multiplying a scalar value with G). By knowing the base point and the private key, enrollment device 210 may generate a public key (e.g., public key Q=d·G). This is one way of generating a public/private key using an EEC cryptosystem, and other ways are possible.

By using an ECC cryptosystem, which is computationally difficult to solve, for universal enrollment using biometric PKI, additional security may be provided for numbers of a same size, used for public/private key pairs, than other methods relying on factoring techniques (e.g., an RSA cryptosystem, discussed further herein below; a Diffe-Hellman cryptosystem; etc.). Smaller numbers may save a device processing time and power. Additionally, if the biometric information is subject to attack and/or stolen, the polynomial curve equation may be changed, thereby changing the public/private key pair.

In some implementations, enrollment device 210 may use the RSA cryptosystem to generate the public/private key pair. Here, enrollment device 210 may determine two large prime numbers. The RSA cryptosystem uses the two large prime numbers to generate the public/private key pair and relies on the difficulty of factorizing large prime numbers to provide security. Enrollment device 210 may calculate a distance between the one or more minutiae points, included in a minutiae template. Additionally, or alternatively, enrollment device 210 may multiply the distance with a first constant (e.g., 10, 100, 1000, etc.) to scale the distance and thereby, obtain a first unique identifier. Additionally, or alternatively, enrollment device 210 may multiply the distance with a second constant (e.g., 20, 200, 2000, etc.) to scale the distance and thereby, obtain a second unique identifier. This is one way of obtaining the first and second unique identifiers and other ways are possible.

Additionally, or alternatively, enrollment device 210 may determine a next closest prime number (i.e., a next highest prime number or a next least prime number) for the first and second unique identifiers (e.g., for a first unique identifier=5000000, the next highest prime number is 5000011; for a second unique identifier=7000000, the next highest prime number is 7000003; for a first unique identifier=8000000, the next least prime number is 7999993; for a second unique identifier=9000000, the next least prime number is 8999993; etc.). The next closest prime numbers, determined for the first and second unique identifiers, may be referred to herein as first prime number (e.g., p) and second prime number (e.g., q), respectively.

To generate the public/private key pair, enrollment device 210 may compute n=p*q, where 'n' may represent a key length for the public/private key pair. 'n' may be used as a modulus for a public key and a private key in the public/private key pair. Additionally, or alternatively, enrollment device 210 may calculate φ(n)=φ(p)φ(q)=(p−1)(q−1)=n−(p+q−1), where φ is Euler's totient function. Enrollment device 210 may keep φ(n) private.

Additionally, or alternatively, enrollment device 210 may select an integer 'e' such that 1<e<φ(n) and gcd(e, φ(n))=1, where 'e' and φ(n) are co-prime. Enrollment device 210 may provide 'e' as a public key exponent. Enrollment device 210 may determine 'd' as d≡$e^{-1}$ (mod φ(n)), such that 'd' is a modular multiplicative inverse of e (modulo φ(n)). In some implementations, 'd' may be determined using an extended Euclidean algorithm. Enrollment device 210 may retain 'd' as private key exponent.

Under the RSA cryptosystem, the public key may include the modulus 'n' and the public (or encryption) exponent 'e.' The private key may include the modulus 'n' and the private (or decryption) exponent d, which remains secret. p, q, and φ(n) also remain secret as p, q, and φ(n) may be used to determine 'd.' This is one way of generating a public/private key using an RSA cryptosystem, and other ways are possible.

Using the EEC cryptosystem and the RSA cryptosystem are some examples of generating a public/private key pair, and other ways are possible.

In some implementations, enforcement device 210 may obtain a shared secret method and/or a shared secret key (e.g., a salt), authorizing enforcement device 210 to generate a public/private key pair to access a service through universal enrollment. The shared secret method and/or the shared secret key may, in some implementations, be provided to all authorized devices participating in universal enrollment (e.g., enforcement device 210, verification server device 240, etc.) at a particular time (e.g., at a time of manufacture, at a time of registering the device as participating in universal enrollment, etc.).

Additionally, or alternatively, enforcement device 210 may use the shared secret method and/or the shared secret key in an algorithm to determine whether the public/private key pair may be generated. Without the shared secret method and/or the shared secret key, enforcement device 210 may be considered unauthorized and may not be able to generate a public/private key pair to access the service through universal enrollment.

Additionally, or alternatively, enforcement device 210 may revoke/change the shared secret method and/or the shared secret key in a case of a security breach (e.g., one or more enrollment devices 210 is compromised) and/or for another reason. Additionally, or alternatively, enforcement device 210 may obtain a new shared secret method and/or a new shared secret key, authorizing enforcement device 210 to generate a new public/private key pair, in the case of a security breach and/or for another reason. The new shared secret method and/or the new shared secret key may be provided to all authorized devices in the case of a security breach and/or for another reason.

As further shown in FIG. 4, process 400 may include obtaining a digital certificate (block 490). For example, enrollment device 210 may associate the public key generated to the identification information for the user. Additionally, or alternatively, enrollment device 210 may request a digital certificate from CA server device 230. The request may include the public key, the associated identification information, the sensor information, the polynomial curve equation, a value for the base point, or the like. CA server device 230 may create a digital certificate, including the public key, sensor information, the polynomial curve equation, the value for the base point, or the like. Sensor information, obtained from the universal enrollment of the user, may be included in the digital certificate to aid in capturing the fingerprint information of the user by another device.

CA server device 230 may associate the digital certificate with the identification information. Enrollment device 210 may receive a signed digital certificate from CA server device 230. CA server device 230 may store a copy of the digital certificate, associated with the identification information, for the user.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
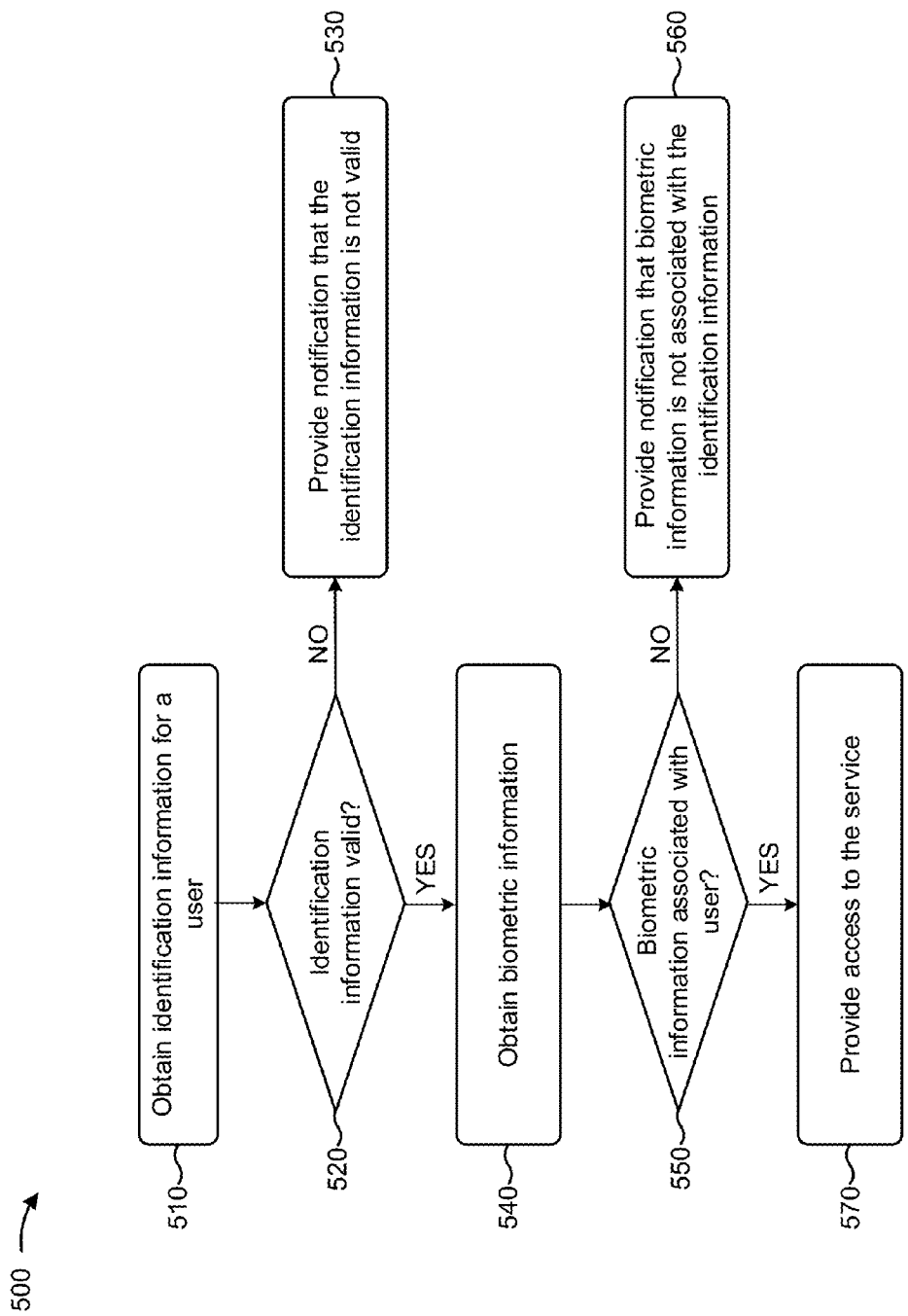
FIG. 5 is a flow chart of an example process for implementing universal enrollment using biometric public key infrastructure.

FIG. 5 is a flow chart of an example process 500 for implementing a system for universal enrollment using biometric PKI. In some implementations, one or more process blocks of FIG. 5 may be performed by verification server device 240. In some implementations, one or more process blocks of FIG. 5 may be performed by another device or a group of devices separate from or including verification server device 240, such as enrollment device 210 and/or CA server device 230.

As shown in FIG. 5, process 500 may include obtaining identification information for a user (block 510). For example, verification server device 240 may obtain identification information for a user of verification server device 240 (e.g., an account number, an account card identifier, a username, a PIN, etc.) for obtaining a form of access (e.g., to a bank account, to a building, to a secure website, etc.). A user of verification server device 240 may input the identification information into verification server device 240. In some implementations, the user may input the identification information into another device that provides the identification information to verification server device 240.

As further shown in FIG. 5, process 500 may include determining whether the identification information is valid (block 520). Verification server device 240 may compare the identification information with stored identification information. If the identification information matches the stored identification information, then the identification information is valid. If the identification information does not match the stored identification information, then the identification information is not valid.

As further shown in FIG. 5, if the identification information is not valid (block 520—NO), process 500 may include providing a notification that the identification information is not valid (block 530). For example, verification server device 240 may provide a notification that the identification information is not valid. Verification server device 240 may provide the notification for display on verification server device 240 and/or provide the notification to another device for display. Verification server device 240 may provide a reason so that a user of verification server device 240 may understand the reason for the notification (e.g., a PIN provided by the user does not match an account number).

As further shown in FIG. 5, if the identification information is valid (block 520—YES), process 500 may include obtaining biometric information (block 540). For example, verification server device 240 may obtain second biometric information from the user of verification server device 240 (e.g., biometric information obtained by verification server 240, such as fingerprint information). The user may place one or more fingers properly (e.g., centered, straight, etc.) on a fingerprint reader, associated with verification server device 240, to obtain fingerprint information. Verification server device 240 may capture fingerprint information (e.g., by scanning) an image of the fingerprint for the one or more fingers.

Additionally, or alternatively, verification server device 240 may request a digital certificate, associated with the identification information, including the public key and/or the sensor information from CA server device 230. Verification server device 240 may use the sensor information and/or other information, provided in the digital certificate, to aid in capturing the fingerprint information.

In some implementations, verification server device 240 may prompt the user to provide the fingerprints in a sequence matching a sequence provided during enrollment. In this way, if the biometric information is subject to attack and/or stolen, an unauthorized user may not be able to access the service without knowing the sequence used, at the time of enrollment, in order to generate a matching private key. In some implementations, block 540 may occur prior to block 520, however, in this case, the information included in the digital certificate, associated with the identification information, may not be used to aid in the capture of fingerprint information by verification server device 240.

As further shown in FIG. 5, process 500 may include determining whether biometric information is associated with the user (block 550). Verification server device 240 may compare an association between the biometric information and the identification information and a previously, created association between biometric information and identification information, obtained during universal enrollment by an enrollment device. For example, verification server device 240 may generate a second private key using a cryptography method (e.g. an ECC cryptosystem, an RSA cryptosystem, etc.), used during universal enrollment, and as discussed with regard to FIG. 4, block 480.

If the second private key matches the public key (i.e., the second private key is a recreation of the private key, created by enrollment device 210 during universal enrollment, and matches the public key), the biometric information is associated with the identification information for the user. Verification server device 240 may determine that the association between the biometric information and the identification information and a previously, created association between biometric information and identification information, obtained during universal enrollment by an enrollment device match.

If the second private key does not match the public key, the biometric information is not associated with the identification information for the user. Verification server device 240 may determine that the association between the biometric information and the identification information and the previously, created association between biometric information and identification information, obtained during universal enrollment by an enrollment device do not match.

In some implementations, verification server device 240 may obtain a shared secret method and/or a shared secret key (e.g., a salt), authorizing verification server device 240 to generate the second private key, matching the public key, to access a service through universal enrollment. The shared secret method and/or the shared secret key may be provided, for example, to all authorized devices participating in universal enrollment (e.g., enforcement device 210, verification server device 240, etc.) at a particular time (e.g., at a time of manufacture, at a time of registering the device as participating in universal enrollment, etc.).

Additionally, or alternatively, verification server device 240 may use the shared secret method and/or the shared secret key in an algorithm to determine whether the second private key may be generated. Without the shared secret method and/or the shared secret key, verification server device 240 may be considered unauthorized and may not be able to generate the second private key, matching the public key, to access the service through universal enrollment.

Additionally, or alternatively, verification server device 240 may revoke/change the shared secret method and/or the shared secret key in a case of a security breach (e.g., one or more verification server devices 240 is compromised) and/or for another reason. Additionally, or alternatively, verification server device 240 may obtain a new shared secret method and/or a new shared secret key, authorizing verification server device to generate the second private key, matching the public key in the case of a security breach and/or for another reason. The new shared secret method and/or the new shared secret key may be provided to all authorized devices, participating in universal enrollment in the case of a security breach and/or for another reason.

As further shown in FIG. 5, if the biometric information is not associated with the identification information for the user (block 550—NO), process 500 may include providing a notification that the biometric information is not associated with the identification information (block 560). For example, verification server device 240 may provide a notification that the biometric information is not associated with the user. Verification server device 240 may provide the notification for display on verification server device 240 or another device. Verification server device 240 may prompt the user to provide the biometric information again. In some implementations, verification server device 240 may deny the form of access (e.g., access to the bank account). In some implementations, verification server device 240 may deny the form of access after a quantity of failed attempts (e.g., after three failed attempts, after 5 failed attempts, after 8 failed attempts, etc.) at obtaining biometric information where the private key does not match the public key.

As further shown in FIG. 5, if the biometric information is associated with the identification information for the user (block 550—YES), process 500 may include providing access to the service (block 570). For example, verification server device 240 may permit the user access to functions and/or features allowed by the service (e.g., check bank account balance, withdraw funds, transfer funds, etc.). Additionally, or alternatively, verification server device 240 may discard the recreated private key, thereby not storing biometric information locally and providing added privacy and security for the biometric information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6G are diagrams of an example implementation 600 relating to example processes 400 and 500 shown in FIGS. 4-5. FIGS. 6A-6G show an example of the example processes shown in FIG. 4 and FIG. 5.

Figure 6A:
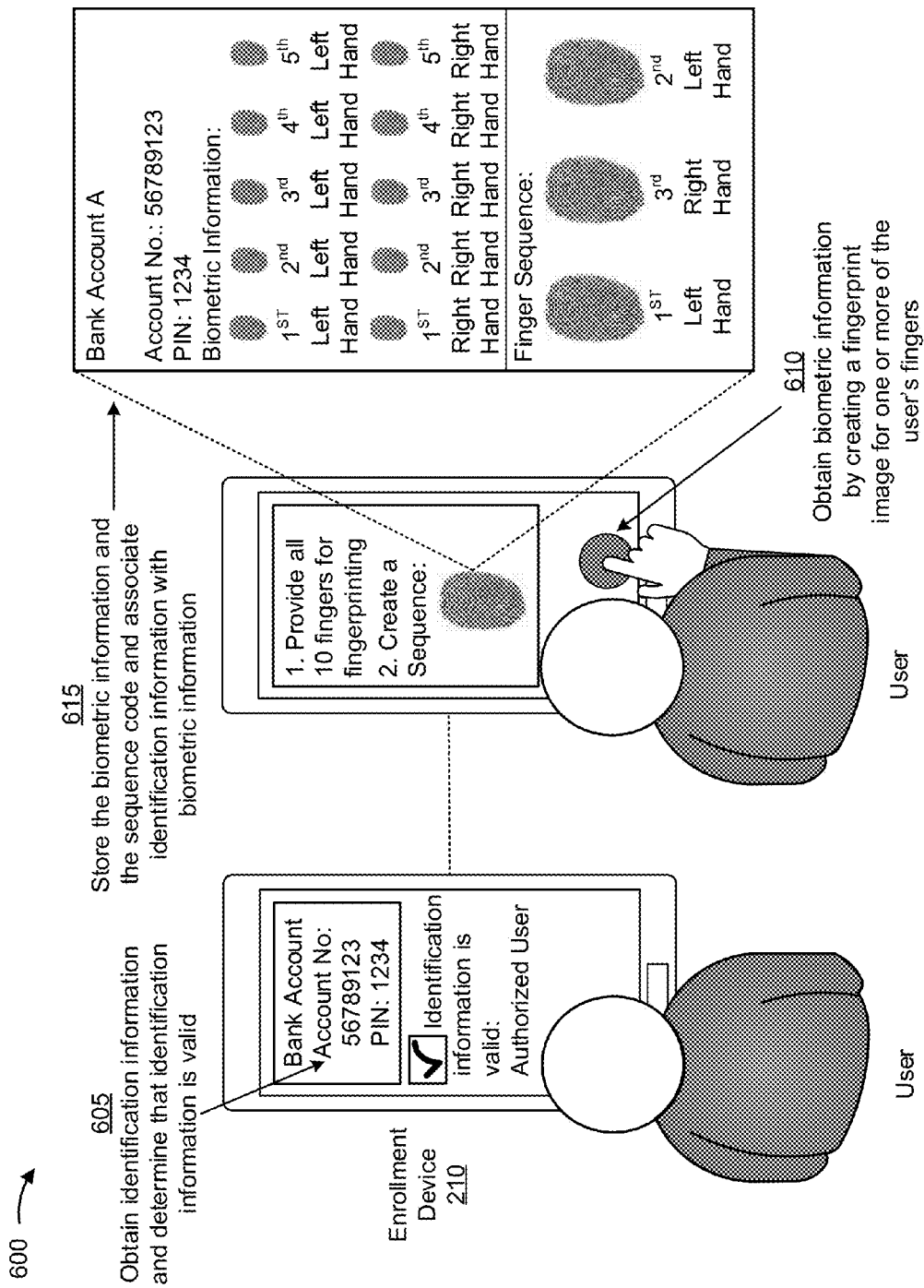
FIG. 6A-6G are diagrams of an example implementation relating to the example processes shown in FIG. 4 and FIG. 5.

As shown in FIG. 6A, assume a user seeks to obtain universal enrollment, using biometric PKI, for a service provided by a service provider (e.g., user seeks to obtain universal enrollment to access one or more services provided by the user's bank, such as on-line banking, automatic teller machine (ATM) access, or the like). The user seeks to enroll one time using the user's mobile device (e.g., enrollment device 210), after which the user expects to use the universal enrollment to rapidly access services, provided by the service provider, using another device different from the device used during universal enrollment.

As shown in FIG. 6A, and by reference number 605, enrollment device 210 obtains identification information for the user, associated with the user's account, with the service provider (e.g., user enters user's bank account number=56789123 and PIN=1234). As shown in FIG. 6A, and by reference number 605, enrollment device 210 determines that the identification information is valid by comparing the identification information inputted by the user with stored identification information, associated with the user, and finding a match (e.g., enrollment device 210 displays that "Identification information is valid: Authorized User").

As shown in FIG. 6A, assume enrollment device 210 has a fingerprint reader capable of scanning a fingerprint to obtain fingerprint information. As shown in FIG. 6A, and by reference number 610, enrollment device 210 obtains biometric information for the user. Enrollment device 210 prompts the user to enter biometric information and provide a sequence for obtaining access (e.g., "Provide All 10 Fingers for Fingerprinting" and "Create A Fingerprint Sequence Code"). As shown in FIG. 6A, the user provides each of the user's ten fingers in turn by placing each of the user's fingers on a biometric reader (e.g., a scanner). The biometric reader captures one or more fingerprint images for each of the user's fingers provided. The user provides a sequence for the fingerprints to obtain access (e.g., a three finger sequence—first finger from left hand, followed by third finger from right hand, followed by second finger from left hand).

As shown in FIG. 6A, and by reference number 615, enrollment device 210 stores the biometric information and the sequence for providing the biometric information and associates the identification information for the user with the biometric information (e.g., associates the identification information of the user's bank account, such as Account Number=56789123 and PIN=1234, with the fingerprint information provided by the user).

Figure 6B:
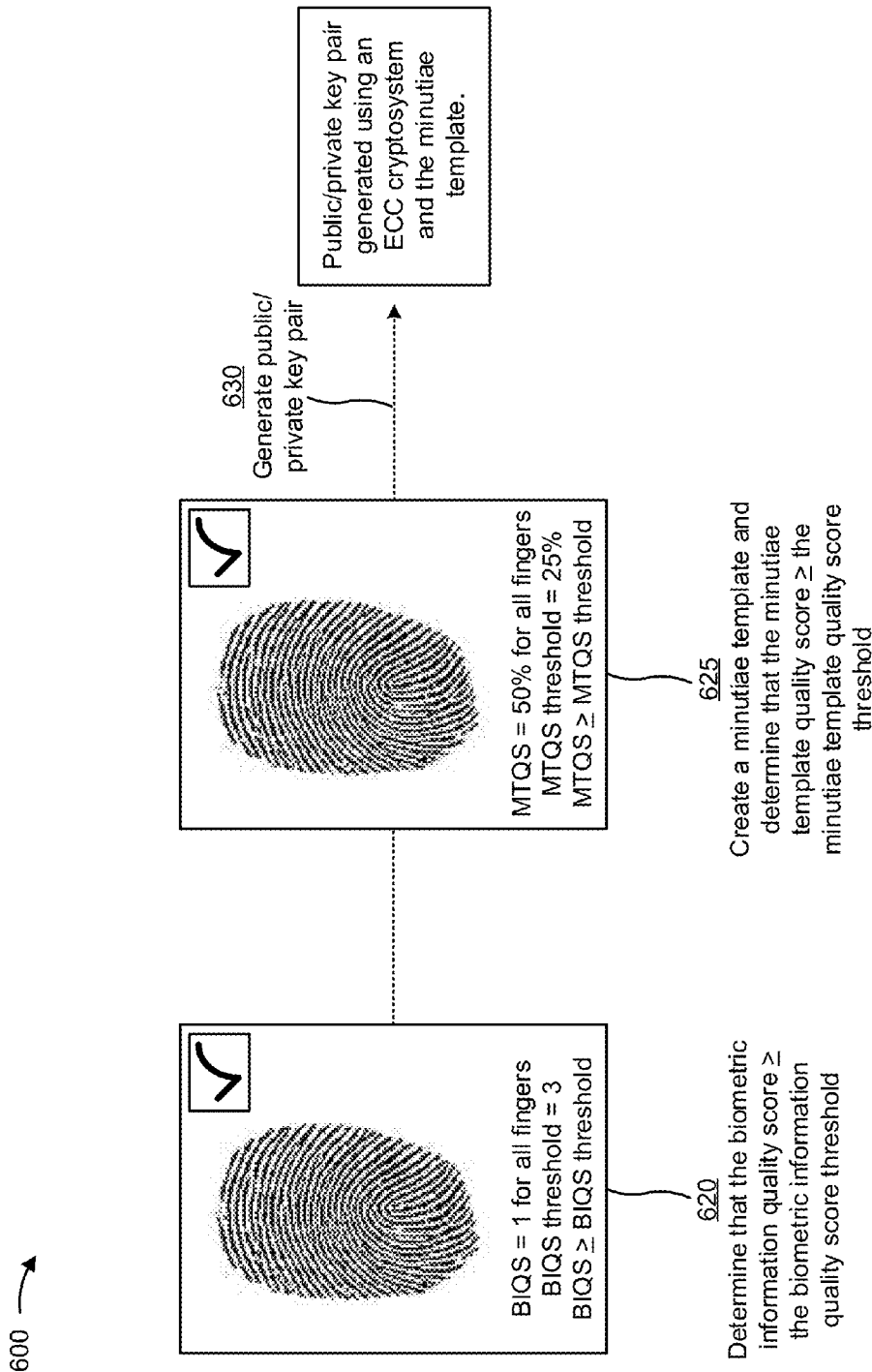

As shown in FIG. 6B, and by reference number 620, enrollment device 210 determines that the BIQS is greater than or equal to the BIQS threshold for the one or more fingerprint images (e.g., BIQS=1, for each of the fingerprint images obtained, and is greater than the BIQS threshold=3, where a score of 1 indicates a superior quality for the fingerprint image and a score of 5 indicates a poor quality for the fingerprint image).

As shown in FIG. 6B, and by reference number 625, enrollment device 210 creates a minutiae template for the one or more fingerprint images obtained. As shown in FIG. 6B, and by reference number 625, enrollment device 210 determines that the MTSQ is greater than or equal to the MTSQ threshold (e.g., MTSQ=50% is greater than the MTQS threshold=25%).

As shown in FIG. 6B, and by reference number 630, enrollment device 210 generates a public/private key pair (e.g., generates a public/private key pair by using an ECC cryptosystem and overlaying the minutiae template for each fingerprint image with a selected polynomial curve equation and base G value).

Figure 6C:
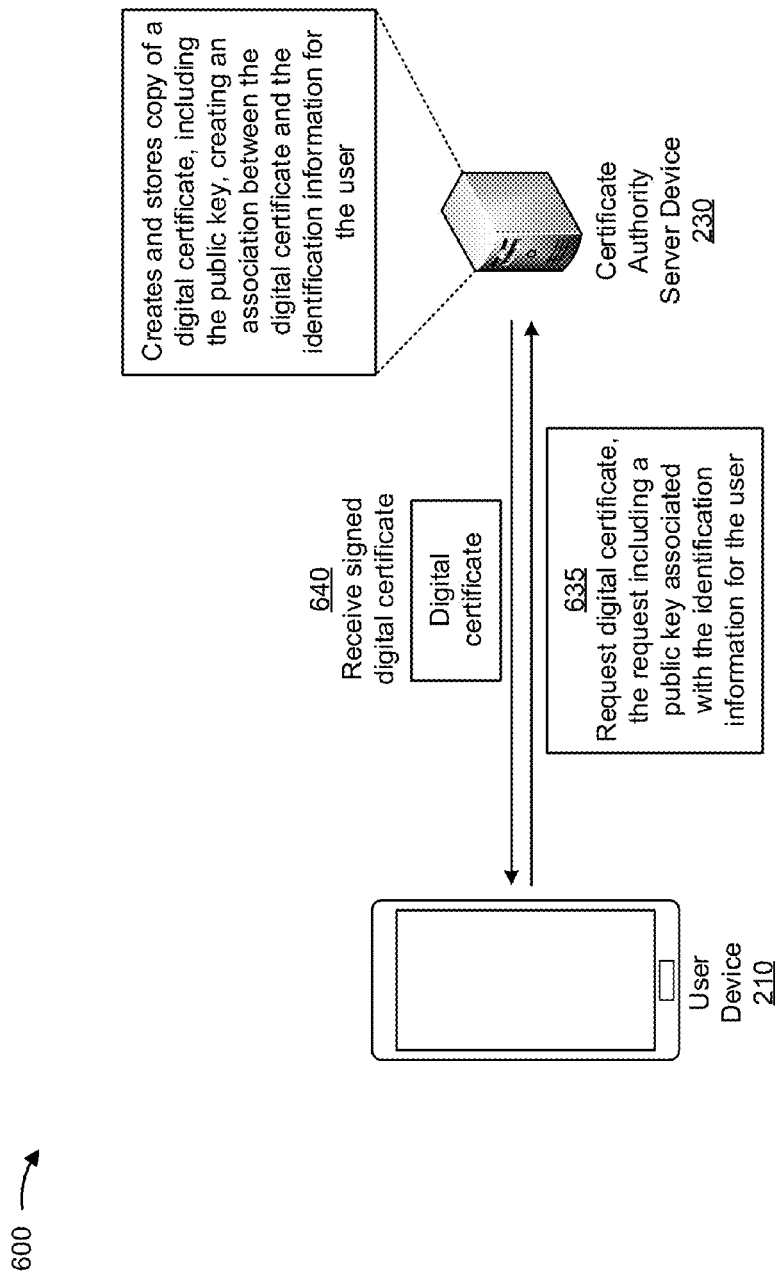

As shown in FIG. 6C, and by reference number 635, enrollment device 210 requests a digital certificate from a CA (e.g., CA server device 230), the request including a public key associated with the identification information for the user. As shown in FIG. 6C, and by reference number 640, enrollment device 210 receives a signed digital certificate created by CA server device 230, associating the public key with the identification information, thus completing the universal enrollment. CA server device 230 stores a copy of the digital certificate with the public key.

Figure 6D:
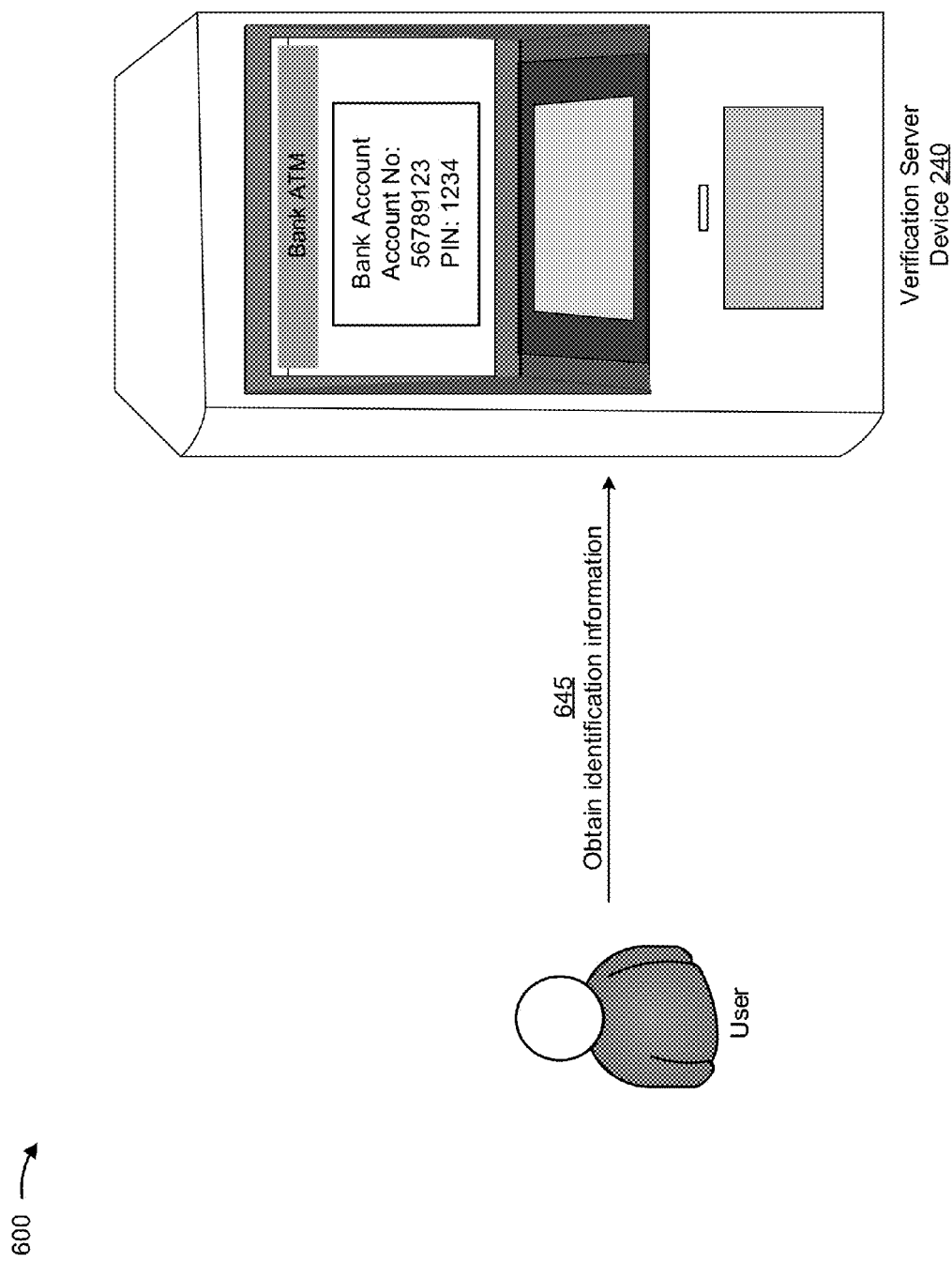

As shown in FIG. 6D, assume the user seeks to perform a service-related activity(e.g., withdraw money) on a device (e.g., verification server device 240) different from the device the user used to obtain universal enrollment (e.g., enrollment device 210). Assume that verification server device 240 is an ATM. As shown in FIG. 6D, and by reference number 645, verification server device 240 obtains identification information from the user (e.g., a bank account number=56789123 is read from an associated bank card and a PIN associated with the bank account number is provided).

Figure 6E:
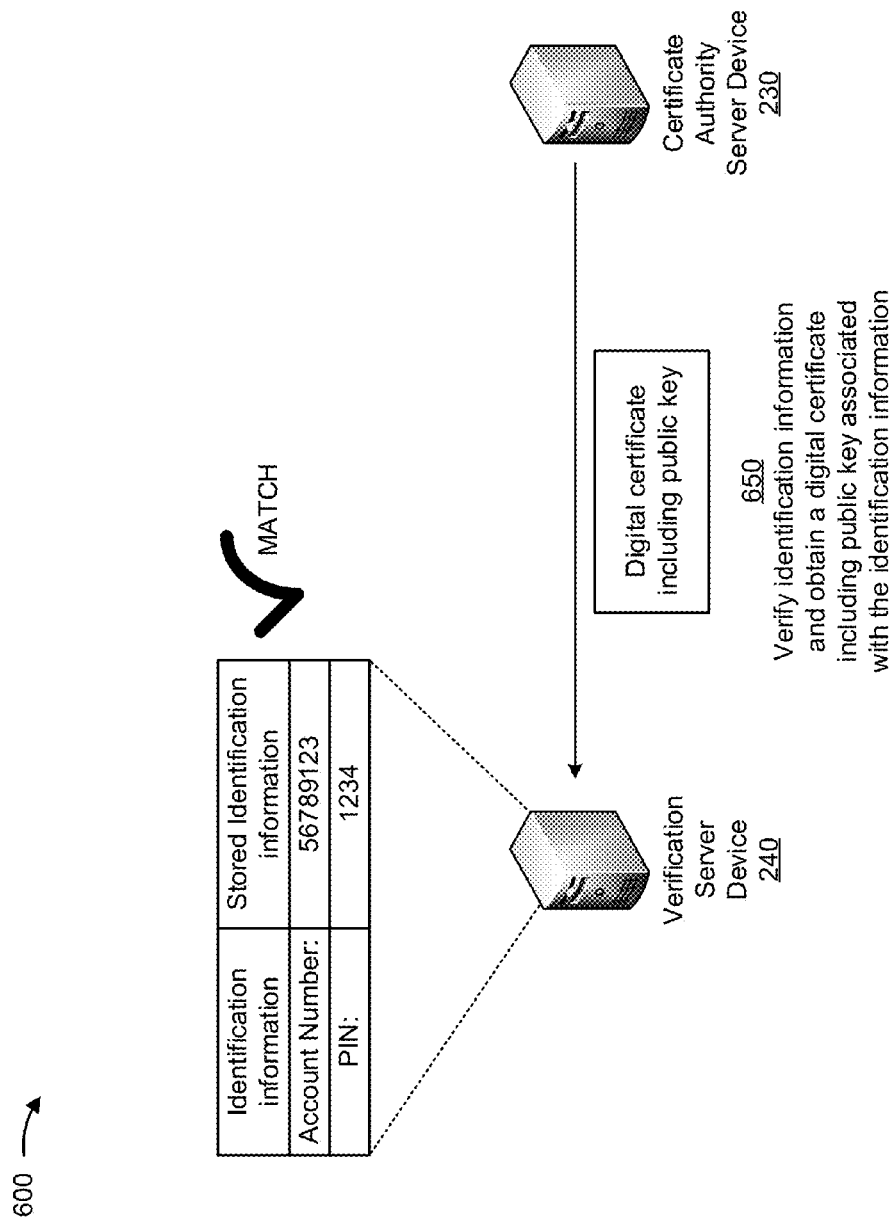

As shown in FIG. 6E, and shown by reference number 650, verification server device 240 compares the identification information with stored identification information and determines a match. Verification server device 240 requests the digital certificate, including the public key associated with the identification information, from CA server device 230.

Figure 6F:
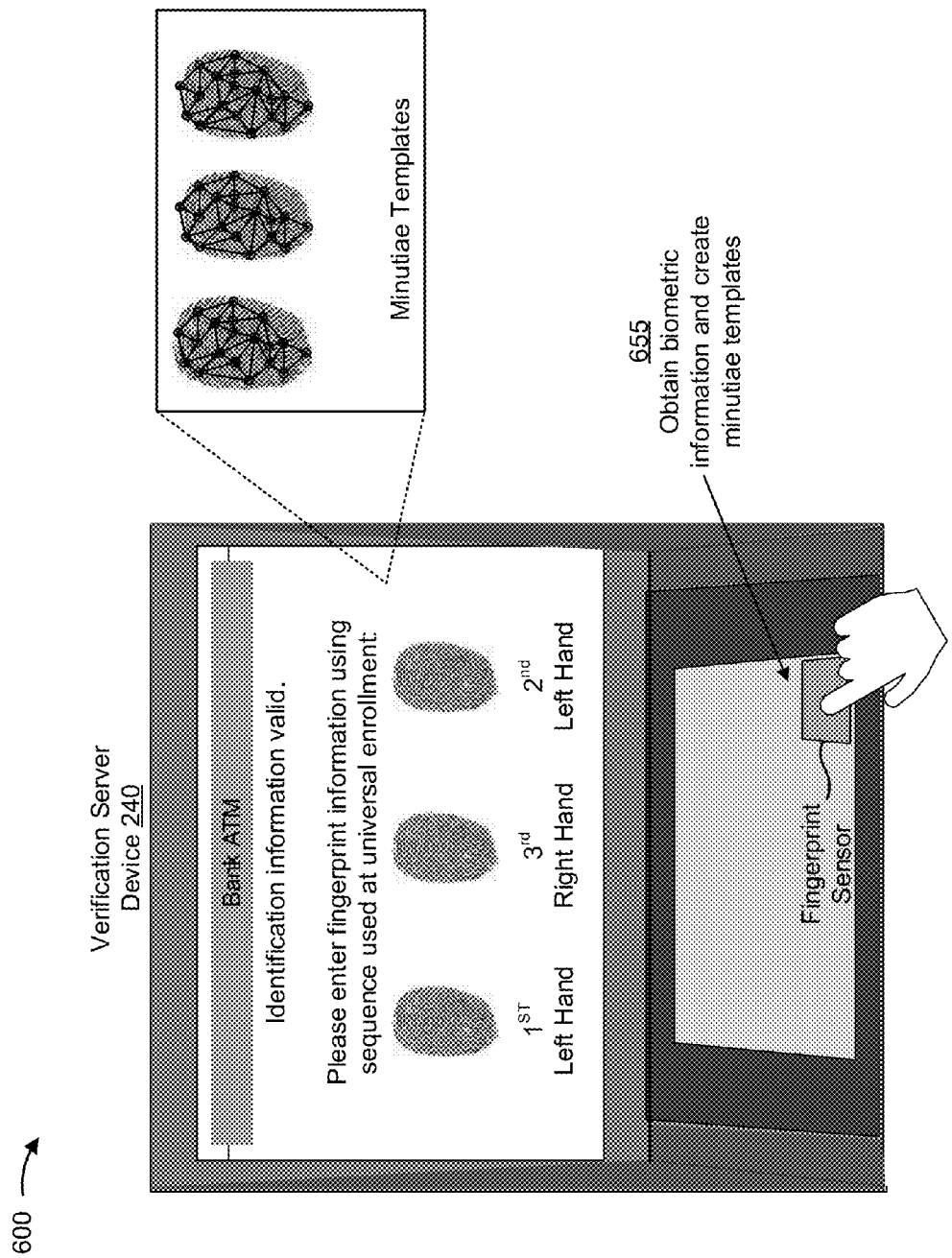

As shown in FIG. 6F, assume that verification server device 240 prompts the user to enter biometric information in the sequence used during the universal enrollment process. Assume verification server device 240 has a fingerprint reader capable of scanning a fingerprint to obtain fingerprint information, including one or more fingerprint images. As shown in FIG. 6F, and shown by reference number 655, verification server device 240 obtains biometric information from the user in the sequence used during the universal enrollment (e.g., first finger left hand, followed by third finger right hand, followed by second finger left hand). As shown in FIG. 6F, and shown by reference number 655, verification server device 240 creates minutiae templates for the one or more fingerprint images.

Figure 6G:
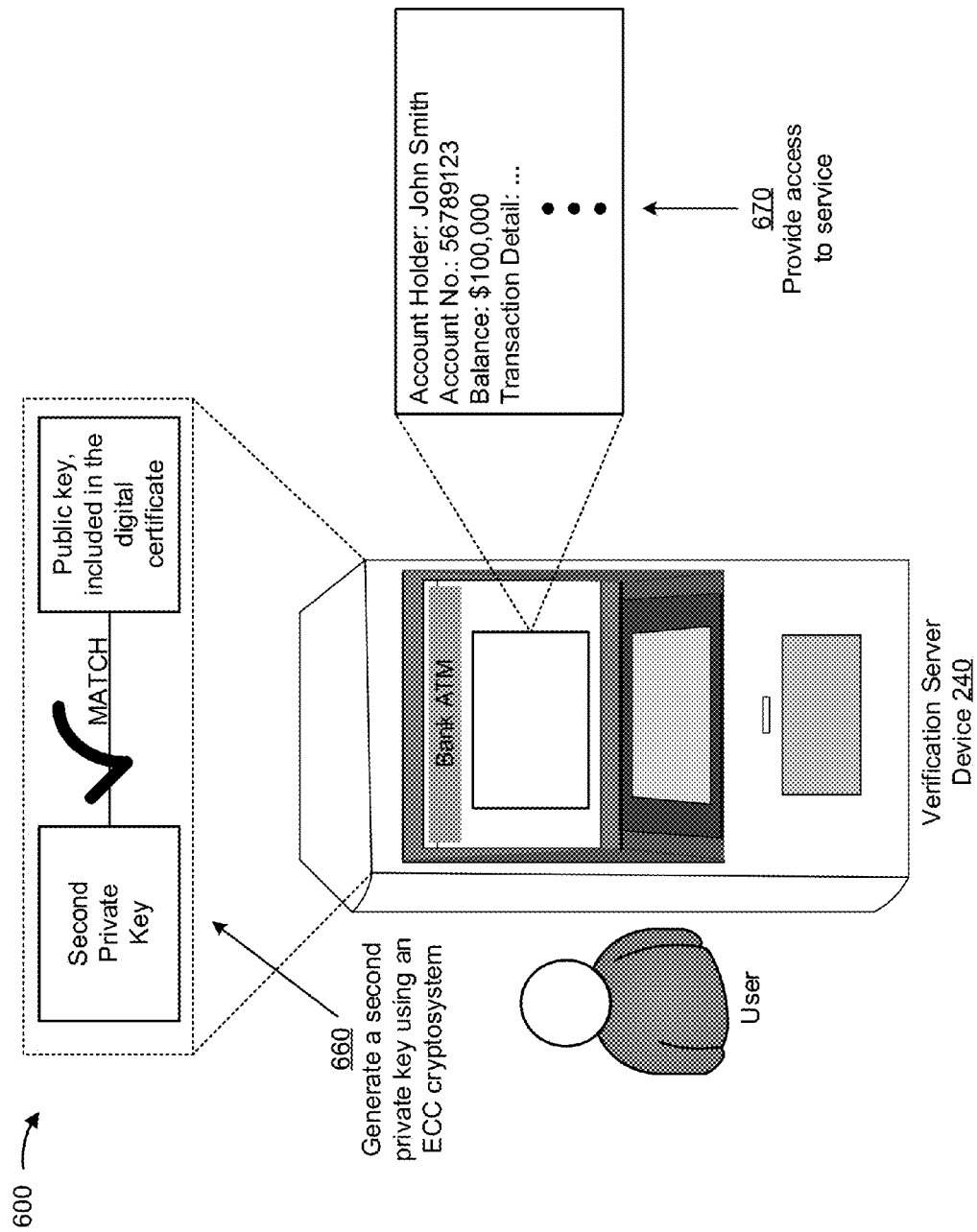

As shown in FIG. 6G, and shown by reference number 660, verification server device 240 generates a second private key using the same cryptography method used during the universal enrollment (e.g., an ECC cryptosystem overlaying the minutiae template created from the biometric information obtained from the user). Verification server device 240 determines that the second private key (e.g., a recreation of the private key of the public/private key pair) is a match for the public key, included in the digital certificate. As shown in FIG. 6G, and shown by reference number 670, verification server device 240 provides the user access to the service.

As indicated above, FIGS. 6A-6G are provided merely as an example. Other examples are possible and may differ from what was described with regard to FIGS. 6A-6G.

Implementations described here utilize a system for universal enrollment using a biometric public key infrastructure (PKI), where a user may enroll for access one time using a first device (e.g., an enrollment device). A generated, public/private key pair using biometric information, associated with identification information for the user, may be used to verify and/or authenticate the user without requiring re-enrollment and/or storage of the biometric information by a second device (e.g. verification server device), allowing the user to access services provided by a service provider from the second device and/or another device.

In this way, the verification device may enable a user to benefit from universal enrollment using biometric PKI, where the user may provide biometric information and enroll one time to access a service. Additionally, sensitive biometric information is not stored beyond the first device, where the biometric information may be a target for an attack. The verification server device may save processing time and computing resources by not requiring the user to re-enroll to obtain access and/or store the biometric information locally.

In situations where the biometric information is compromised, calculations used in a cryptography method selected for generating the public/private key pair may be altered. This way, an unauthorized user may not gain access and/or the enrollment device does not need to use processing time and computing resources for re-enrollment relating to security issues.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
   one or more devices,
   each of the one or more devices including:
   a memory to store instructions; and
   one or more processors to execute the instructions to:
   obtain identification information for a user for obtaining a form of access using universal enrollment;
   generate a public key, private key pair based on at least one of a shared secret method or a shared secret key;
   obtain, based on generating the public key, private key pair, a digital certificate associated with the identification information,
   the digital certificate including a public key of the public key, private key pair,
   the public key and a private key of the public key, private key pair are generated using elliptical curve cryptography based on a first template of first biometric information of the user obtained during the universal enrollment, and
   the digital certificate comprising:
   sensor information, and
   information related to the elliptical curve cryptography;
   obtain second biometric information,
   the sensor information is used when obtaining the second biometric information, and
   the second biometric information is used to provide authentication for obtaining the form of access;
   create a second template based on the second biometric information;
   generate an elliptical curve based on the information related to the elliptical curve cryptography from the digital certificate;
   identify at least one overlapping point using the second template and the elliptical curve;
   generate a second private key using the elliptical curve cryptography based on the at least one overlapping point;
   determine whether information of the second private key corresponds to information of the public key included in the digital certificate; and
   provide the form of access based on information of the second private key corresponding to information of the public key included in the digital certificate.

2. The system of claim 1, where the one or more processors of the one or more devices are further to:
   compare the identification information with stored identification information; and
   determine that the identification information is valid based on the identification information matching the stored identification information.

3. The system of claim 2, where, when comparing the identification information with stored identification information, the one or more processors of the one or more devices are to:
   provide a notification that the identification information is not valid when the identification information does not match the stored identification information.

4. The system of claim 1, where, when obtaining the second biometric information, the one or more processors of the one or more devices are to:
   obtain the second biometric information based on prompting the user to provide the second biometric information.

5. The system of claim 1, where, when obtaining the second biometric information, the one or more processors of the one or more devices are to:
   obtain the second biometric information in a first sequence,
   the first sequence matching a second sequence used when obtaining the first biometric information during the universal enrollment.

6. The system of claim 1, where, when determining whether the second private key corresponds to the public key, the one or more processors of the one or more devices are to:
   provide a notification that the second biometric information is not valid when the second private key does not correspond to the public key.

7. The system of claim 1, where the first biometric information of the user meets a quality score threshold.

8. The system of claim 1, where the digital certificate is obtained from a certificate authority server device.

9. A non-transitory computer-readable medium storing instructions, the instructions comprising:
one or more instructions that, when executed by one or more processors, cause the one or more processors to:
obtain identification information for a user for obtaining a form of access using universal enrollment;
generate a public key, private key pair based on at least one of a shared secret method or a shared secret key;
obtain, based on generating the public key, private key pair, a digital certificate associated with the identification information,
the digital certificate including a public key of the public key, private key pair,
the public key and a private key of the public key, private key pair are generated using elliptical curve cryptography based on a first template of first biometric information of the user obtained during the universal enrollment, and
the digital certificate comprising:
sensor information, and
information related to the elliptical curve cryptography;
obtain second biometric information of the user,
the sensor information is used when obtaining the second biometric information, and
the second biometric information is used to provide authentication for obtaining the form of access;
create a second template based on the second biometric information;
generate an elliptical curve based on the information related to the elliptical curve cryptography from the digital certificate;
identify at least one overlapping point using the second template and the elliptical curve;
generate a second private key using the elliptical curve cryptography based on the at least one overlapping point;
determine whether information of the second private key corresponds to information of the public key included in the digital certificate; and
provide the form of access based on information of the second private key corresponding to information of the public key included in the digital certificate,
the second private key is a recreation of the private key.

10. The non-transitory computer-readable medium of claim 9, where the one or more instructions, when determining whether the information of the second private key corresponds to the information of the public key included in the digital certificate, cause the one or more processors to:
provide a notification that the second biometric information is not associated with the user when the second private key does not correspond to the public key included in the digital certificate; or
deny the form of access when the second private key does not correspond to the public key in the digital certificate.

11. The non-transitory computer-readable medium of claim 10, where the one or more instructions, when executed by the one or more processors, further cause the one or more processors to:
prompt the user to provide the second biometric information again.

12. The non-transitory computer-readable medium of claim 11, where the one or more instructions, when executed by the one or more processors, further cause the one or more processors to:
deny the form of access after a quantity of failed attempts at obtaining the second biometric information when the second private key does not correspond to the public key.

13. The non-transitory computer-readable medium of claim 9, where the one or more instructions, when executed by the one or more processors, further cause the one or more processors to:
discard the second private key.

14. The non-transitory computer-readable medium of claim 9, where the first biometric information of the user meets a quality score threshold.

15. A method comprising:
obtaining, by a device, identification information for a user for obtaining a form of access using universal enrollment;
generating, by the device, a public key, private key pair based on at least one of a shared secret method or a shared secret key;
obtaining, by the device and based on generating the public key, private key pair, a digital certificate associated with the identification information based on the identification information matching stored identification information,
the digital certificate including a public key of the public key, private key pair,
the public key and a private key of the public key, private key pair are generated using elliptical curve cryptography based on a first template of first biometric information of the user obtained during the universal enrollment, and
the digital certificate comprising:
sensor information, and
information related to the elliptical curve cryptography;
obtaining, by the device, second biometric information from the user,
the sensor information is used when obtaining the second biometric information, and
the second biometric information is used to provide authentication for obtaining the form of access;
creating, by the device, a second template based on the second biometric information;
generating, by the device, an elliptical curve based on the information related to the elliptical curve cryptography from the digital certificate;
identifying, by the device, at least one overlapping point using the second template and the elliptical curve;
generating, by the device, a second private key using the elliptical curve cryptography based on the at least one overlapping point;
determining, by the device, whether information of the second private key corresponds to information of the public key included in the digital certificate; and
providing, by the device, the form of access based on information of the second private key corresponding to information of the public key included in the digital certificate.

16. The method of claim 15, where the second biometric information is obtained using a biometric reader associated with the device.

17. The method of claim 15, where obtaining the second biometric information comprises:

obtain the second biometric information based on prompting the user to provide the second biometric information.

18. The method of claim 15, where the digital certificate is obtained from a certificate authority server device.

19. The method of claim 15, where the first biometric information or the second biometric information includes at least one of:
a fingerprint,
palm veins,
a facial characteristic,
an iris characteristic, or
a voice characteristic.

20. The method of claim 15, where the first biometric information of the user meets a quality score threshold.

* * * * *